Dec. 26, 1933.  S. A. MALTHANER  1,941,405
DEMOUNTABLE RIM WHEEL
Filed Sept. 2, 1930
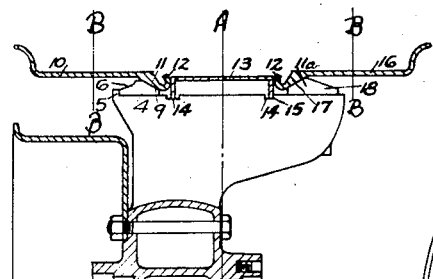
Fig. 2
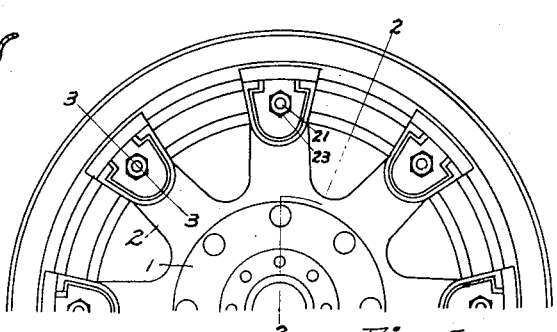
Fig. 1
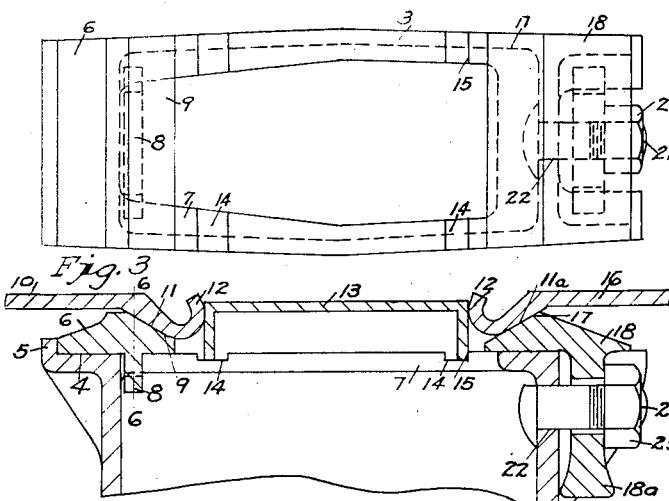
Fig. 3
Fig. 5
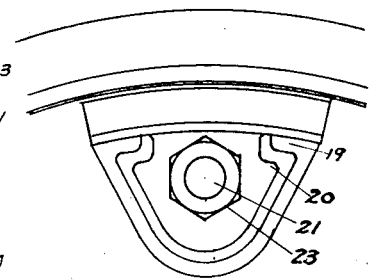
Fig. 4
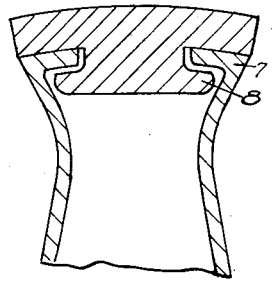
Fig. 6
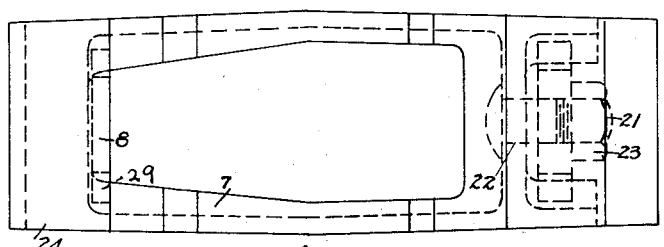
Fig. 7
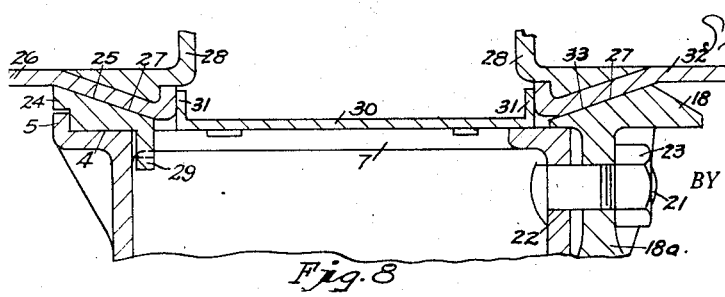
Fig. 8
Sylvester M Malthaner
INVENTOR.
BY
ATTORNEYS.

Patented Dec. 26, 1933

1,941,405

UNITED STATES PATENT OFFICE 1,941,405

DEMOUNTABLE RIM WHEEL

Sylvester A. Malthaner, Erie, Pa., assignor to Erie Malleable Iron Company, Erie, Pa., a corporation of Pennsylvania Application September 2, 1930. Serial No. 479,192

5 Claims. (Cl. 301—13)

Demountable rims are made in various forms. These forms vary slightly in contour and consequently are not interchangeable on wheels. The present invention is directed to so forming the wheel that it may be readily converted to accommodate rims of different makes. Features and details of the invention will appear from the specification and claims.

A preferred embodiment of the invention is illustrated in the accompanying drawing as follows:—

Fig. 1 shows an elevation of a wheel, a part being broken away and shown in section.

Fig. 2 a section on the line 2—2 of Fig. 1.

Fig. 3 an end view of one of the wheel spokes with the rims removed.

Fig. 4 an enlarged elevation of one of the clamps.

Fig. 5 an enlarged section on the line 2—2 in Fig. 1.

Fig. 6 a section on the line 6—6 in Fig. 5.

Fig. 7 is an enlarged view of the spoke end for supporting modified rims.

Fig. 8 shows a sectional view of the spoke end shown in Fig. 7 with the parts mounted thereon carrying modified rims.

The wheel centers are the same as to all the structures shown, in fact, one of the objects of the invention is to make the wheel centers which, as before stated, can be readily converted to accommodate the different rims. The wheel center comprises the hub portion 1 and spokes 2. The spokes are hollow at their ends and provided with pads 3. An insert supporting face 4 is arranged along the axially inner periphery of the wheel center. A shoulder 5 is arranged along the axially inner edge of this face. An inboard rim supporting insert 6 is mounted on the face. The open end of the spoke is provided with inturned flanges 7 and the insert has the T-shaped projection 8, these flanges and the T-shaped projection forming under-cut sliding connections between the insert and the spoke. The insert is provided with a tapered seat 9 and the inboard rim 10 is provided with a beveled seat 11 adapted to engage the seat 9, this beveled seat 11 being opposite a gutter 12 which is peculiar to this type of rim. A split spacing ring 13 is arranged on the periphery. It has radially inturned flanges which extend into grooves 14, the axially outer shoulder 15 of the groove forming an alining abutment operating in conjunction with the ring 13 to aline the rims. An outboard rim 16 has its beveled surface 11a seated on a beveled seat 17 on an outboard rim supporting insert 18. This outboard insert has a flange 18a extending along the outboard face of the spoke. The spoke has an outboard extension with circumferentially inturned ribs 19 and the flange 18a has shoulders 20 extending under the flanges 19. This forms an under-cut sliding connection between the insert and the end of the spoke. A bolt 21 extends through an opening 22 in the outboard wall of the spoke and through an opening in the flange 18a and is provided with a clamping nut 23 by means of which the insert may be forced inwardly.

The operation of the structure can be readily understood. When it is desired to demount the rim, the insert 18 is removed, allowing the removal of the outer rim, the ring 13 is removed and the inboard rim can then be readily removed. In re-setting the rims in place the inboard rim is put in place, the spacer ring put in place with the axially outer edge against the shoulder 15, the outboard rim is placed, and the insert 18 placed and the screws set up clamping the inserts 18 against the beveled seat 11 and this clamping action is communicated by the ring 13 to the inboard rim.

The same wheel center in every particular is shown in Figs. 7 and 8 utilizing a slightly different type of rim, the seats of which are of slightly different bevel. Inboard rim supporting inserts 24 are mounted on the faces 4, these inserts 24 having beveled seats 25. An inboard rim 26 has a beveled seating surface 27 and is provided with the hook tire supporting ring 28. The insert 24 has a T-shaped projection 29 which extends under the inturned flanges 7, thus forming an under-cut sliding connection between the insert and the wheel end. A spacing ring 30 is provided with radially out-turned flanges 31, these flanges engaging the edge of the rib formed by the bevel 27 on the inboard rim and a similar part on the outboard rim 32.

The beveled seat 27 on the outboard rim engages a beveled seat 33 on the outboard rim supporting insert 18, the insert being provided with a bevel 33 on one face adapting it to engage the type of rim shown in Fig. 8 and a different bevel on its opposite face adapting it to accommodate the type of rim shown in Fig. 5. The other parts are the same in both structures and function in the same manner. It will readily be seen that by providing this variation of inserts exactly the same wheel center with exactly the same faces and machining can be used to accommodate either type of rim at very little expense and very little change in the parts.

It will be seen that with both forms of rims the centers B—B of the rims are spaced equally from the wheel, or thrust center A—A.

What I claim as new is:—

1. In a dual wheel, the combination of a wheel center having a seating face on the axially inner side of the periphery of the wheel center adapted to support an inboard rim, said wheel center having an outboard rim supporting seat; a plurality of removable rim supporting inserts on said face, said inserts having tapered rim engaging seats, and a sliding connection between the inserts and the wheel center securing the inserts on the center.

2. In a dual wheel, the combination of a wheel center having a seating face on the axially inner side of the periphery of the wheel center adapted to support an inboard rim, said wheel center having an outboard rim supporting seat; a removable rim supporting insert on said face, said insert having a tapered rim engaging seat; and a sliding connection between the insert and the wheel center comprising axially extending and circumferentially projecting flanges on the wheel center and undercut projections on the insert engaging said flanges.

3. In a dual wheel, the combination of a wheel center having a seating face on the axially inner side of the periphery of the wheel center, and an axially outer seating face on the axially outer side of the periphery of the wheel center; an inboard rim supporting insert on said axially inner seating face, said insert having a tapered rim engaging seat; and an outboard rim supporting insert on said axially outer seating face, said insert having reversible seats on its radially outer peripheral face whereby the insert may be adapted to rims having different beveled seats.

4. In a dual wheel, the combination of a wheel center having a seating face on the axially inner side of the periphery; a seating face on the axially outer side of the periphery, said wheel center having axially extending circumferentially inturned flanges adjacent to said faces; an inboard rim supporting insert on said axially inner seating face having an under-cut projection engaging the flanges adjacent to said faces and a beveled rim engaging seat; an outboard rim supporting insert, said out-board rim supporting insert being reversible to reverse its tapered faces whereby the insert may be adapted to rims having different beveled seats; a flange extending from the insert; and clamping means operating on the flange.

5. In a dual wheel, the combination of a wheel center having a seating face on the axially inner side of the periphery; a seating face on the axially outer side of the periphery, said wheel center having axially extending circumferentially inturned flanges adjacent to said seating faces; an inboard rim supporting insert on said axially inner face having an under-cut projection engaging the flanges adjacent to said faces and a beveled rim engaging seat; an outboard rim supporting insert, said out-board rim supporting insert being reversible to reverse its tapered faces whereby the insert may be adapted to rims having different beveled seats; a flange extending from the insert; and clamping means operating on the flange, said flange forming an undercut connection with the inturned flanges on the wheel center.

SYLVESTER A. MALTHANER.